United States Patent
Stratman

[15] 3,646,964
[45] Mar. 7, 1972

[54] COUPLING DEVICE FOR PERMITTING COUPLING UNDER TRAPPED PRESSURE

[72] Inventor: Paul E. Stratman, Minneapolis, Minn.
[73] Assignee: Parker-Hannifin Corporation, Cleveland, Ohio
[22] Filed: Feb. 28, 1967
[21] Appl. No.: 619,239

[52] U.S. Cl. ................137/614.03, 137/614.05
[51] Int. Cl. .......................................F16l 37/28
[58] Field of Search .........137/614.03, 614.04, 614.05; 251/149.1, 149.9

[56] References Cited

UNITED STATES PATENTS

| | | | |
|---|---|---|---|
| 3,215,161 | 11/1965 | Goodwin | 136/614.04 |
| 3,431,942 | 3/1969 | Kopaska | 137/614.05 |
| 3,348,575 | 10/1967 | Simak | 137/614.05 |

FOREIGN PATENTS OR APPLICATIONS

| | | | |
|---|---|---|---|
| 996,408 | 6/1965 | Great Britain | 137/614.04 |

*Primary Examiner*—Samuel B. Rothberg
*Assistant Examiner*—William A. Wright
*Attorney*—John N. Wolfram

[57] ABSTRACT

This invention relates to a valved quick disconnect coupler in which two coupling halves, each connectable to a respective conduit for fluid, may be connected to each other while either or both conduits are under high-fluid pressure.

28 Claims, 3 Drawing Figures

PATENTED MAR 7 1972

3,646,964

INVENTOR.
PAUL E. STRATMAN

BY John N. Wolfram

ATTORNEY

COUPLING DEVICE FOR PERMITTING COUPLING UNDER TRAPPED PRESSURE

Valved quick disconnect coupling devices are used to connect conduit sections of various types of fluid handling systems, one example being the fluid lines in a hydraulic system for operating agricultural implements. Such couplings commonly have a check valve in each coupling half which is closed when the parts are disconnected but which is opened by the act of connecting the coupling halves to each other. Quite often it is desirable to make the connection while one or both of the associated conduit sections are under high-fluid pressure. In such cases this is difficult to do by the simple manual act of pushing the one coupling member into the other because such manual effort must open the check valves against the high-fluid pressure. Some presently known couplers have attempted to solve this problem by balancing the fluid pressures acting on the check valves but this has proven unsatisfactory.

The present invention solves the problem of connecting while either or both conduit sections are under high pressure by permitting the check valve or valves that are subject to high pressure to remain closed while the connection is being made and providing a biasing means that opens the check valve on the pump or tractor side of the coupler when the pump pressure is relieved and which permits the check valve on the implement or motor side to be opened by pump pressure when the latter is reapplied, such biasing means also acting to maintain the check valves in open position after they have been opened. The biasing means is carried by one of the coupling halves and there is another means to render the biasing means ineffective for opening the check valve in that coupling half when the two halves are not interconnected.

The invention further provides a means for releasably interlocking the coupling halves in coupled relation, including a locking sleeve and ball-type detent and also including a cocking member that holds the locking sleeve in a released position when the coupling halves are disconnected and that permits automatic movement of the locking sleeve to lock position when the coupling halves are in fully coupled position to thereby facilitate coupling of the coupling members.

The invention also provides a means to prevent fluid trapped between the check valves during coupling movement of the coupling halves from precluding completion of such coupling movement.

Figure 1:
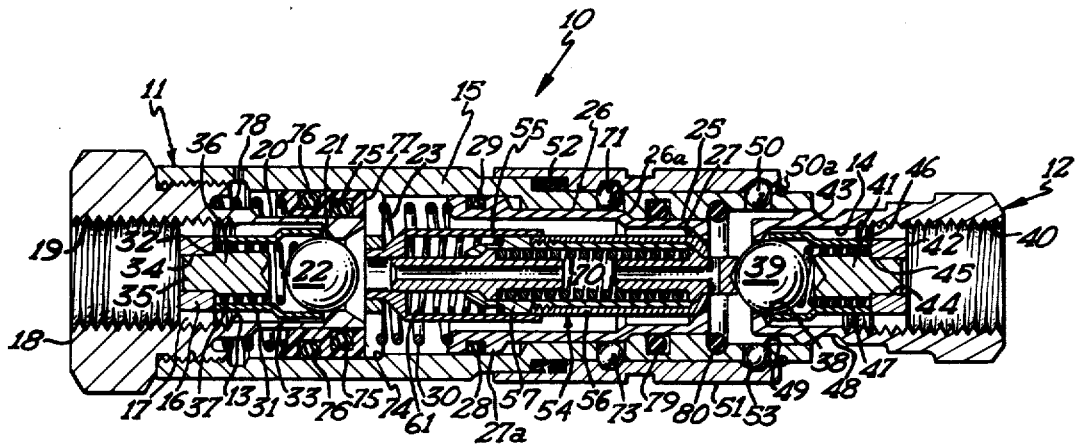
FIG. 1 is a longitudinal central sectional view through the coupler showing the one-half partially inserted into the other.

Coupler 10 includes a socket or female body half 11 that may be connected by thread 19 to a fluid conduit (not shown) leading from a pump and also includes a tip or male half 12 that is connectable by thread 40 to a fluid conduit (not shown) leading to a fluid motor on a farm implement or other device.

Socket 11 includes a shell 15 threaded to a screw tip 18 having a cylindrical extension 20 that has a bore 13 and a valve seat 21 against which a ball check valve 22 may seat.

A shielding sleeve 31 within bore 13 has an enlarged portion 33 that closely fits over ball 22 and is integral as by brazing or unitary construction with a spider head 16 whose threaded legs are engaged with thread 19 and with the spaces between the legs providing flow passages 17. Spider head 16 has an opening 34 that slidably receives the reduced end 35 of plunger 36 having shoulder 32 that engages spider head 16 to limit rearward movement of ball 22. Spring 37 urges ball 22 toward closed position against seat 21.

The check valve arrangement in tip 12 is identical to that in socket 11. Thus tip 12 has a bore 14 ending at a valve seat 38 and it also has a shielding sleeve 41 with an enlargement 43 containing ball check valve 39 and with an integral spider head 42 threaded into thread 40 and with flow passages between the spider legs. Spider head 42 has a bore 44 to slidably receive the reduced end of plunger 46 and the latter has a shoulder 45 engageable with spider head 42 to limit opening travel of ball 39 away from seat 38. Spring 47 urges ball check valve 39 toward seat 38.

Shell 15 has an O-ring 80 engageable by tip 12 when the latter is inserted into socket 11. Tip 12 has an annular groove 48 that registers with an annularly disposed series of detent balls 50 carried in radial holes 49 of shell 15 when tip 12 is fully inserted within socket 11. A collar 51 is slidably mounted on shell 15 and has a groove 53 to receive detent balls 50 and another groove 71 to receive another series of detent balls 73 carried in radial openings 72 when the collar is in the retracted position shown in FIG. 1. A spring 52 urges the collar toward the extended position shown in FIG. 2 and a snap ring 50a limits rightward movement of the collar. A cocking sleeve 24 within shell 15 has a cylindrical portion 26 which when in register with balls 73 maintains the same within groove 71 to prevent rightward movement or extension of collar 51. Sleeve 24 also has a reduced cylindrical portion 25 which when in register with balls 73 permit them to retract from groove 71 to release collar 50 so that spring 52 will move it to extended position with a snap action. A spring 30 urges cocking sleeve 24 to the right as viewed in the drawing and O-rings 29 and 79 make sealing engagement with the cocking sleeve and shell 15.

Mounted within shell 15 is a spider head 23 whose legs are clamped against a shoulder 74 within the shell by the forward end of screw tip 18. Spider head 23 has a central bore 55a into which an end of a tubular sleeve 55 is pressed. Slidable within sleeve 55 is a cartridge or cage 54 that includes an outer sleeve 56 threaded to an inner sleeve 57 and providing inturned shoulders 58 and 59 at opposite ends thereof.

A spring 61 bears against a shoulder on inner sleeve 57 urging it toward the right.

Within cage 54 and having portions extending therefrom are plungers 62 and 66 respectively having annular shoulders 63, 67 with a spring 70 extending therebetween. Plunger 62 has a central bore 65 intersecting a cross drill 65a. Plunger 66 has a through bore 69.

Shell 15 also contains a metallic volume relief piston 77 slidably mounted on cylindrical extension 20 and sealed with respect thereto by a packing 75 and sealed relative to shell 15 by packing 76. Spring 78 urges piston 77 toward contact with the legs of spider head 23 and the space behind piston 77 is relieved to atmosphere by a bleed port 85.

The coupling parts, when tip 12 is disconnected from socket 11, are in the positions shown in FIG. 1 regardless of whether there is high-fluid pressure within the tip or socket behind check valves 39 and 22 because the check valves are held closed by their respective springs 47 and 37 if there is no fluid pressure behind the check valves and by the springs plus fluid pressure if the latter is present. Fluid within shell 15 to the right of check valve 22 normally will have drained to the exterior via bores 65 and 65a during the time that tip 12 is disconnected from socket 11.

Assuming that there is high-fluid pressure behind each check valve, as tip 12 is brought toward connecting position, ball 39 engages plunger 62 as shown in FIG. 1. Further inward movement of the tip will then cause spring 61, which has less resistance than either of springs 37, 47 and 70, to compress. This permits the cage 54 to be moved to the left by ball 39 until plunger 66 engages check valve 22. At this time packing 80 will have engaged tip 12 to seal the interior of the coupling from the exterior.

Figure 2:
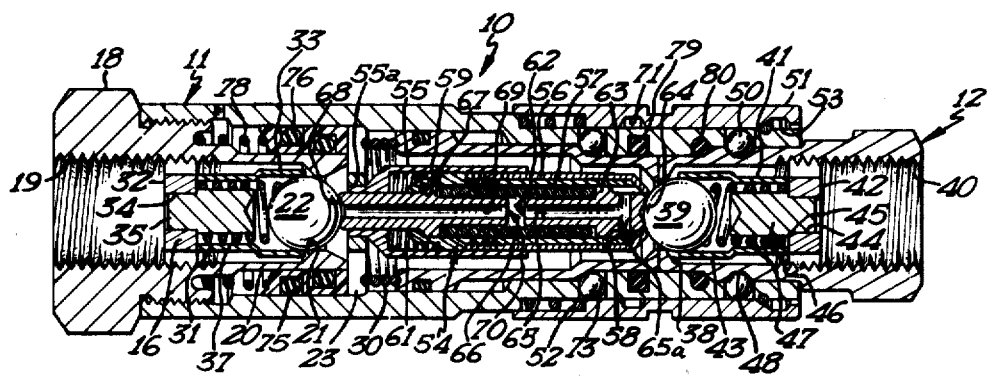
FIG. 2 is a similar view showing the coupling halves completely coupled and showing the check valves held in closed position by high-fluid pressure.

Upon further coupling movement of tip 12 to the position shown in FIG. 2, spring 70 is compressed and plunger 62 has moved leftward toward plunger 66. Also, tip 12 has engaged cocking sleeve 24 and moved it leftward until reduced cylindrical portion 25 has registered with balls 73 permitting them to withdraw from groove 71. At this time balls 50 are also in register with groove 48 and spring 52 snaps collar 51 to the right to lock balls 50 into groove 48 and thus securely attach tip 12 to socket 11.

Check valves 22 and 39 are not under considerable force from spring 70 tending to open the same and would open if there was no fluid pressure holding them closed because spring 70 is stronger than either of springs 37, 47 but with pressure in the hydraulic lines they remain closed.

During the coupling movement of tip 12, if insufficient fluid had previously drained from the socket through ports 65, 65a, and if both check valves remain closed because of fluid pressure therebehind, the fluid trapped between the check valves, after tip 12 has contacted packing 80, tends to be compressed as tip 12 is inserted beyond packing 80. Because hydraulic fluid is relatively incompressible a pressure would then be developed on the fluid between check valves 22, 39 by such further movement of tip 12 sufficient to cause piston 77 to move to the left and thus provide space to the right of the piston for accepting fluid displaced by tip 12.

Figure 3:
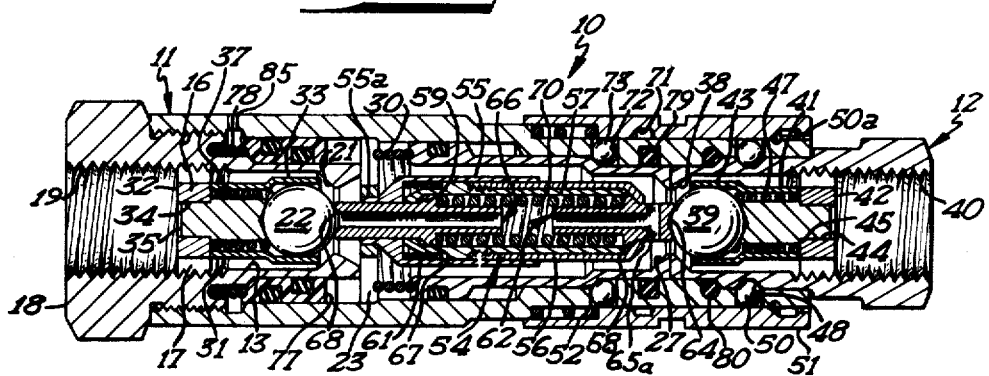
FIG. 3 is a similar view but showing the check valves in open position.

Upon completion of the coupling movement, fluid pressure in screw tip 18 behind ball check valve 22 may be momentarily relieved by appropriate manipulation of the hydraulic system directional control valve (not shown) to drop the pressure in the hydraulic line to which screw tip 18 is connected. This permits spring 70 to overcome spring 37 and ball 22 opens. The directional control valve is again manipulated to repressurize the hydraulic line to which screw tip 18 is connected. Because ball 22 is now open, repressurizing the line connected to screw tip 18 puts pressure fluid into shell 15 between balls 22 and 39 that opens ball 39 against pressure trapped therebehind. Spring 70 then causes plungers 62 and 66 to follow balls 39 and 22 respectively to their open positions and hold them there, as shown in FIG. 3, until the coupling halves are subsequently disconnected. Stop plungers 35, 46 limit the opening movement of balls 22, 39 so that neither ball can move so far away from its seat that the other ball could shift cartridge 54 and reseat.

To disconnect, collar 51 is manually retracted against spring 52 until groove 53 registers with balls 50 to release them from groove 48. Tip 12 will then be moved toward the right by spring and fluid forces within the coupling and as it does so spring 61 will cause cartridge 54 to follow it rightwardly so as to permit springs 37, 47 to close check valves 22, 39 against their respective seats. Spring 30 will also move cocking sleeve 24 to the right to push balls 73 into groove 71 to lock collar 51 in its retracted position. Rightward movement of the cocking sleeve is limited by engagement of its shoulder 26a with a shoulder in shell 15 and rightward movement of cartridge 54 is limited by its engagement with shoulder 27 of the cocking sleeve. Spring 78 then returns piston 77 to the right.

Sleeves 31 and 41 shield the respective balls 22 and 39 from the effects of fluid flow to prevent their inadvertent closing. The balls have a close sliding fit with the inner wall of shielding sleeves 31, 41 and the forward portions of the balls that project from the sleeves when the balls are against their seats 21, 38 have no rearwardly facing surfaces acted upon by flowing fluid and the shielding sleeves prevent flowing fluid from impinging on the rear surfaces of the balls within the sleeves. Thus, with the valves open as shown in FIG. 3, if pressure fluid is flowing from screw tip 18 through the coupling and out through tip 12, sleeve 31 shields ball 22 whereby the flowing fluid exerts only friction force to such ball tending to compress spring 70 and close the ball against its seat 21. Likewise, if fluid is returning from tip 12 toward screw tip 18, sleeve 41 shields ball 39 to prevent the flowing fluid from exerting a force on ball 39 other than from friction for carrying ball 39 to its closed position against the opening force of spring 70.

I claim:

1. A quick coupling device comprising a pair of coupling members, each member having a (spring seated) check valve therein seated by a yieldable means, means for coupling the members to each other, and biasing means (within the device exerting a force on each of said check valves tending to open the same) which when the members are coupled urges both valves toward open position but is yieldable to permit both valves to be closed.

2. The coupling device of claim 1 in which the opening force exerted by the biasing means upon each check valve when the members are coupled is greater than the force exerted by the respective check valve (springs) yieldable means whereby each check valve is unseated by the biasing means in the event such check valve is subject only to the force of its (spring) yieldable means for seating the same.

3. The coupling device of claim 1 in which the biasing means is carried by one of the members and there is a resilient means that moves the biasing means to an inoperative position relative to the check valve in said one member when the members are uncoupled whereby the biasing means is prevented from exerting an opening force on the check valve in said one member sufficient to overcome the (spring force) yieldable means tending to seat the valve in said one member.

4. The coupling device of claim 1 in which said biasing means comprises a spring, and means for exerting a preload upon the spring when the members are uncoupled.

5. The coupling device of claim 1 in which the biasing means includes a spring, said members are coupled by moving the members axially toward each other, said check valves engage said biasing means prior to full coupling movement of the members, and one of said check valves being moveable with its associated member toward the other check valve upon further coupling movement of the members when there is a predetermined fluid pressure in the member containing said one check valve to thereby compress said spring.

6. The coupling device of claim 1 in which one of said members carries a tubular sleeve that supports said biasing means.

7. The coupling device of claim 1 in which said biasing means includes a compression spring and a plunger between each check valve and the compression spring.

8. The coupling device of claim 1 in which there is a stop means for each check valve to limit the opening movement of the same whereby the biasing means continues to exert a force on each check valve when both are fully open that is greater than the closing force exerted on each check valve by its (spring) yieldable means.

9. The coupling device of claim 6 in which one of the members has a chamber containing the biasing means, and passage means venting said chamber to atmosphere when the members are uncoupled.

10. The coupling of claim 1 in which said biasing means includes a pair of spring pressed plungers each engaging a respective one of the check valves, a cage supported by one of the members and slidably supporting the plungers therein, said cage having a shoulder at each end engageable with a shoulder on a respective one of the plungers for retaining the same within the cage.

11. The coupling device of claim 1 in which one of the members has a valve seat and contains a shielding sleeve that has an open end facing said seat, said shielding sleeve is closed at its other end, the associate check valve in said one member projects into said shielding sleeve at said open end and has a close sliding fit with the inner wall of said shielding sleeve, the shielding sleeve is radially spaced from a surrounding wall of said one member to form a flow passage therebetween, a spring within the shielding sleeve urges the associated check valve toward said seat, a portion of said check valve is exposed to fluid flowing through said passage when said associated check valve is in open position, said portion is devoid of a transverse surface facing away from the valve seat whereby fluid flowing past said portion toward said seat imposes only friction force against said associated check valve tending to close the same, and said biasing means imposes an opening force against said associated check valve that is greater than the sum of said friction and spring forces to thereby maintain said associated check valve in open position when fluid is flowing through said passage toward said seat.

12. The coupling of claim 10 in which the cage is slidably supported by said one member and is spring pressed in a direction away from the check valve in said one member when the members are uncoupled to carry said biasing means to an inoperative position relative to the check valve in said one member.

13. A coupling device comprising a socket member and a tip member, the tip member being telescopingly received within the socket member to a fully coupled position relative thereto, means for interlocking said members when the tip is in said fully coupled position, each of said members having a spring seated check valve therein, one of said members having a hollow extension that forms a chamber between said check valves when the members are fully coupled, means establishing a seal between said members upon initial movement of the tip member into the socket member to thereby close said chamber, yieldable means contained within the chamber exerting an opening force upon each check valve when the members are fully coupled, such force being insufficient to open said check valves when the check valves are subject to a closing force exerted thereupon by a predetermined pressure of fluid trapped within the respective members behind the check valves but which opening force is sufficient to open each check valve against the action of its spring when the pressure of fluid within the respective member is less than said predetermined pressure.

14. The coupling device of claim 13 in which said chamber includes a wall moveable in a direction for enlarging said chamber to thereby compensate for decrease of the chamber size as the tip member moves into the socket member.

15. The coupling of claim 14 in which the movable wall is spring pressed toward a position for decreasing the chamber size.

16. A coupling device comprising a socket member and a tip member each having a spring seated check valve therein, means for coupling the members to each other, biasing means exerting a force on one of said check valves tending to open the same when the members are coupled, such force being greater than the seating force exerted upon such check valve by its seating spring, said coupling means including a shoulder on the tip member, first detent means carried by the socket member, a locking sleeve carried by the socket members and having means in an extended position of the locking sleeve to lock the first detent means into engagement with said shoulder, a spring urging the locking sleeve toward said extended position, second detent means carried by the socket member and movable to a position for engaging an abutment on the locking sleeve to hold the same in a retracted position, a cocking sleeve within the socket member and spring pressed to a first position in which it holds said second detent means in engagement with said abutment, said cocking sleeve being engageable by said tip member and movable by the same to a second position in which it releases said second detent means, means to retain the cocking sleeve within the socket when the tip member is withdrawn, and said cocking sleeve having a shoulder engageable with said biasing means to retain the latter within said socket member when the members are uncoupled.

17. The coupling device of claim 16 in which the second detent means is radially movable into and out of engagement with said abutment means, and the cocking sleeve has first and second cylindrical portions of different diameters for alternately engaging the second detent means when in register therewith to thereby cause said radial movement.

18. A coupling device comprising a socket member and a tip member, a first detent means carried by the socket member, a locking sleeve slidable on the socket member between extended and retracted position, a first spring urging the locking sleeve towards said extended position, means on the locking sleeve for locking the first detent means in engagement with a shoulder on the tip member for holding the members in coupled position, a second detent means engageable with an abutment on the locking sleeve to hold the latter in its retracted position, a cocking sleeve carried by the socket member and movable by a second spring to a first position in which it holds the second detent against said abutment, said cocking sleeve being engageable by the tip member and movable thereby to a second position in which it releases said second detent from engagement with said abutment to thereupon permit said first spring to move the locking sleeve to said extended position, a check valve in each member, and a biasing means within the cocking sleeve acting on both check valves tending to open the same when the members are coupled.

19. The coupling device of claim 18 in which said second detent means is also carried by the socket member and is a fixed axial distance from the first detent means.

20. The coupling device of claim 18 in which the second detent means is radially movable relative to the socket member and said cocking sleeve has a first portion of a diameter which when in register with the second detent means permits the latter to move radially inward to a position out of engagement with said abutment means, and said cocking sleeve has a second portion of a diameter which when in register with the second detent means moves the latter radially outward for engagement with said abutment.

21. The coupling device of claim 18 in which there is a packing on each side of the second detent means sealing the cocking sleeve relative to the socket member.

22. A coupling for releasably connecting and intercommunicating a pair of conduits, including:
   a pair of body members, one of which is connected to a conduit leading to means for supplying fluid under pressure and the other of which is connected to a conduit leading to a device to be powered by the pressurized fluid,
   means for releasably connecting said body members end to end in a telescoping relationship,
   said body members having longitudinal bores with opposed annular valve seats located in said bores and disposed in coaxially spaced relationship when said body members are connected,
   check valves in said body members each adapted to seat in fluidtight relationship against its respective valve seat, resilient means positioned within said body members and urging said check valves against their respective seats, and
   means located in one of said body members and adapted upon connecting of said body members to exert an unseating force against each of said check valves which force is greater than the seating force exerted against each of said check valves by its resilient means but less than the sum of seating forces exerted against each of said check valves by its resilient means and by the pressurized fluid in its conduit.

23. The structure of claim 22 further characterized in that said unseating force exerting means includes spring means which is compressed and moved towards the valve seat of said fluid pressure supplying conduit body upon connecting of said body members.

24. The structure of claim 22 further characterized in that said unseating force exerting means includes a pair of spring means aligned end to end, one of which is compressed and moved towards the valve seat of said fluid pressure supplying conduit body member upon connecting of said body members and the other of which remains stationary upon said connecting of said body members but is compressed by the check valve of said other body member.

25. The structure of claim 23 further characterized in that said unseating force exerting means is located in said fluid pressure supplying conduit body member and is adapted to be engaged by a contact means supported on the other body member and to be moved towards said valve seat of said pressure supplying conduit member to increase the compression of said spring means.

26. The structure of claim 22 further characterized in that said unseating force exerting means includes a first tube fixed in position in the bore of one of said body members and containing a spring means adapted to be compressed upon connecting of said body members and a second tube in said bore telescoped with respect to said first tube and adapted to be moved towards the check valve of the fluid pressure supplying conduit body member upon connecting of said body members with a spring means in said second tube adapted to be compressed upon connecting of said body members.

27. The structure of claim 26 further characterized in that said second tube includes means adapted to be contacted by a contact means supported on said other body member and to move said second tube towards the check valve of the fluid pressure supplying conduit body member upon connecting of said body members.

28. The structure of claim 27 further characterized in that sealing means are formed on said second tube and in the bore of the body member in which said second tube is positioned with said sealing means adapted to prevent fluid flow through said bore when said body members are unconnected and to permit fluid flow through said bore when said second tube is moved towards said check valve.

* * * * *

UNITED STATES PATENT OFFICE
CERTIFICATE OF CORRECTION

Patent No. 3,646,964     Dated March 7, 1972

Inventor(s) Paul E. Stratman

It is certified that error appears in the above-identified patent and that said Letters Patent are hereby corrected as shown below:

In the claims, column 3, line 69, delete "(spring sealed)", lines 71-73, delete "(within the device exerting a force on each of said check valves tending to open the same)".

Column 4, line 4, delete "(springs)"; line 7, delete "(spring)"; line 14, delete "(spring force)"; line 39, delete "(spring)"; line 55, change "associate" to --associated--.

Signed and sealed this 25th day of July 1972.

(SEAL)
Attest:

EDWARD M. FLETCHER, JR.
Attesting Officer

ROBERT GOTTSCHALK
Commissioner of Patents